Nov. 29, 1949      E. E. HOOD      2,489,964
BACK PEDALING BRAKE FOR VELOCIPEDES
Filed April 2, 1945      2 Sheets-Sheet 1
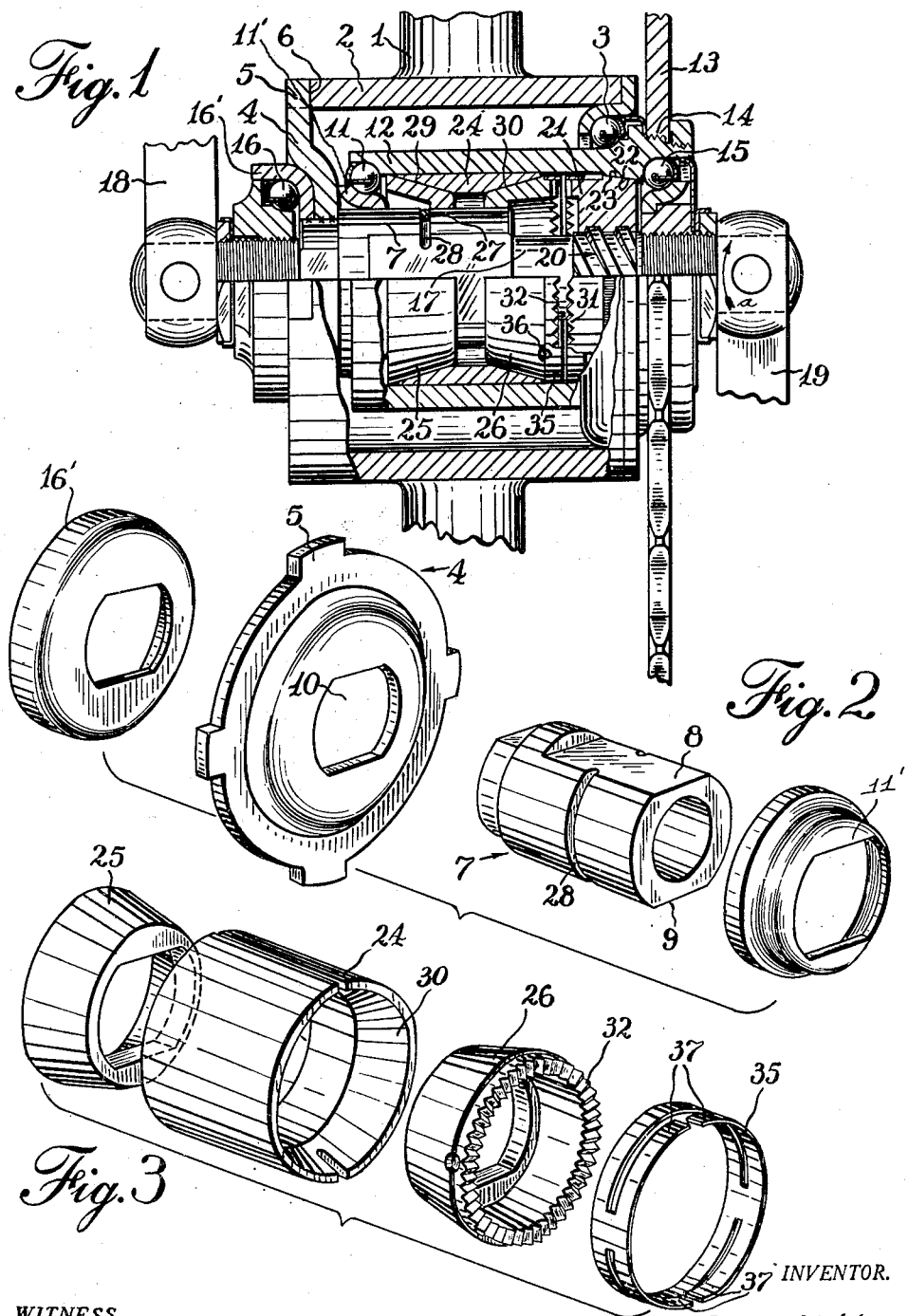

Nov. 29, 1949     E. E. HOOD     2,489,964
BACK PEDALING BRAKE FOR VELOCIPEDES
Filed April 2, 1945     2 Sheets-Sheet 2
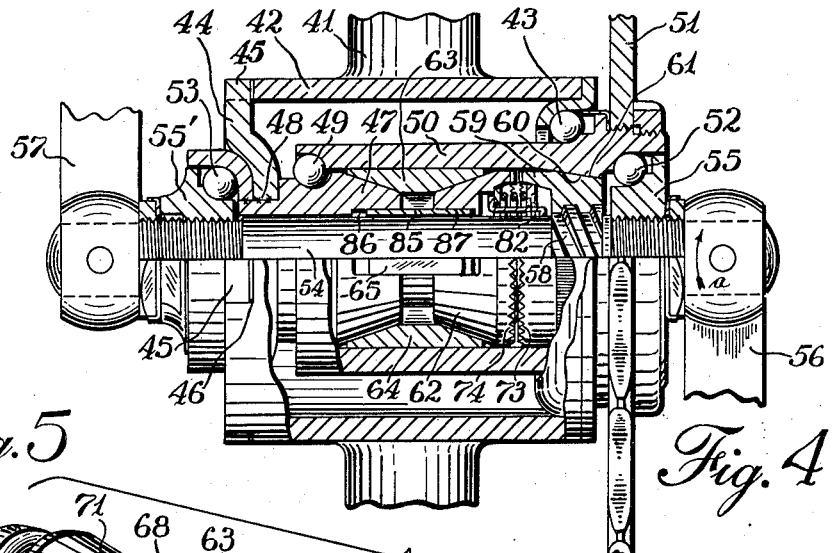
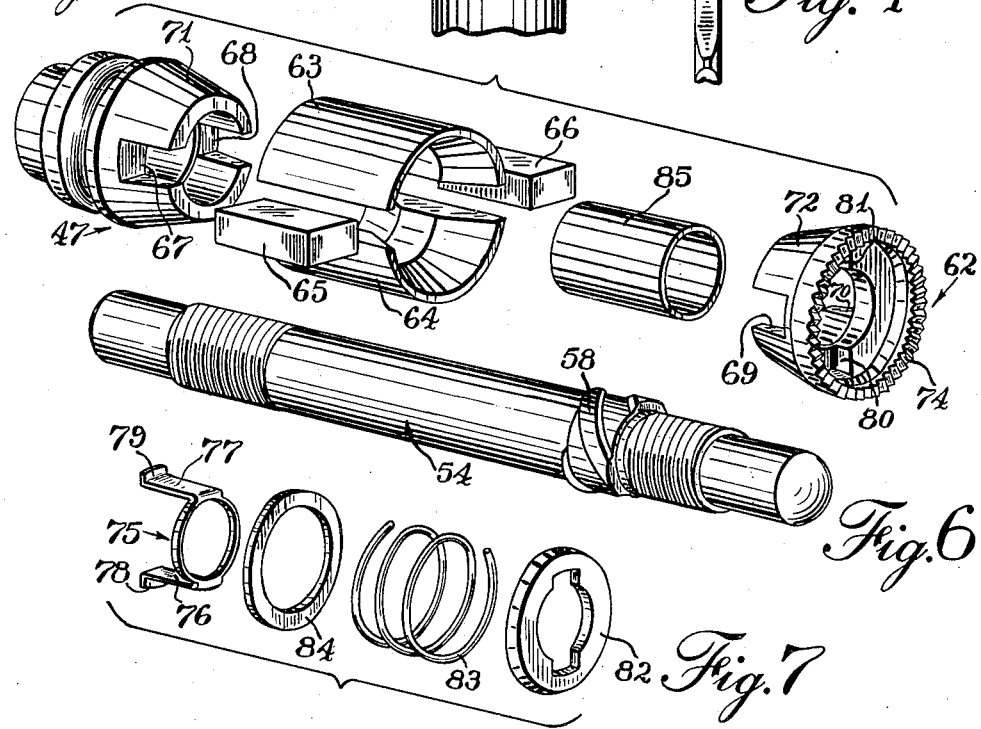
WITNESS
Esther M. Stockton
INVENTOR.
E. Elliott Hood
BY
Clinton S. Janes
ATTORNEY Patented Nov. 29, 1949

2,489,964

UNITED STATES PATENT OFFICE 2,489,964

BACK PEDALING BRAKE FOR VELOCIPEDES

E. Elliott Hood, Elmira, N. Y., assignor to Bendix Aviation Corporation, South Bend, Ind., a corporation of Delaware Application April 2, 1945, Serial No. 586,217

3 Claims. (Cl. 192—6)

The present invention relates to a back pedaling brake for velocipedes and the like and more particularly to such a brake which is arranged to be actuated directly by the crank shaft of the vehicle.

It is an object of the present invention to provide a novel back pedaling brake which is simple and rugged in construction, positive in action and has very little lost motion.

It is another object to provide such a device which is adapted to be housed and supported by the crank shaft of the vehicle.

Further objects and advantages will be apparent from the following description taken in connection with the accompanying drawing in which:

Fig. 1 is a side elevation partly broken away and in section of a preferred embodiment of the invention;

Fig. 2 is a detail view in perspective of the anchoring means for the brake sleeve shown in disassembled relation;

Fig. 3 is a similar view of the brake sleeve with its actuating members;

Fig. 4 is a view similar to Fig. 1 of a second embodiment of the invention;

Fig. 5 is a detail view in perspective of the brake shoes and the anchoring and expanding means therefor, shown disassembled;

Fig. 6 is a detail in perspective of the crank shaft; and

Fig. 7 is a detail in perspective of the retarding means for the clutch-nut member, in disassembled relation.

In Fig. 1 of the drawing there is illustrated a portion 1 of the frame of a velocipede comprising a tubular crank-hanger housing 2 having an anti-friction bearing 3 in one end thereof. An anchor plate 4 is mounted in the opposite end of the housing 2 and is non-rotatably connected therewith by means of radial lugs 5 (Fig. 2) which enter corresponding slots 6 in said housing.

A sleeve 7 having a non-cylindrical external surface formed by making flats 8 and 9 thereon is non-rotatably mounted in an opening 10 in the anchor plate conforming to the flattened contour of the sleeve. An anti-friction bearing comprising balls 11 and cone member 12' is mounted on the sleeve 7, and a barrel member 12 is journalled thereon at one end, the opposite end of the barrel projecting outside the housing 2 through the bearing 3 which forms a support therefor. A drive sprocket 13 is rigidly mounted on the outer end of the barrel member 12 as indicated at 14.

An anti-friction bearing 15 is provided in the outer end of the barrel member 12, an anti-friction bearing comprising balls 16 seated in a race 16' is mounted on the outer end of the sleeve 7, and a drive shaft 17 having crank arms 18 and 19 fixed on the ends thereof is journalled in said bearings 15, 16. The crank shaft 17 is threaded for a portion of its length as indicated at 20, and a clutch member 21 is threaded thereon and is provided with a conical clutch surface 22 arranged to cooperate with a similar clutch surface 23 in the interior of the barrel member 12 to connect the barrel for rotation with the clutch member.

An expansible brake sleeve 24 is loosely supported in the barrel member 12 by means of actuating members 25 and 26 slidably but non-rotatably mounted on the sleeve 7. Stop means for the actuating member 25 is provided in the form of a lock ring 27 seated in a groove 28 in the sleeve 7. The interior of the brake sleeve 24 is conically tapered from both ends as shown at 29 and 30, and the outer surfaces of the actuating members 25 and 26 are similarly tapered so that movement of the actuating member 26 toward the actuating member 25 causes the brake sleeve 24 to be expanded into frictional engagement with the interior of the barrel member.

The clutch member 21 and brake actuating member 26 are provided with clutch teeth 31 and 32 respectively which are adapted to cooperate when the clutch member is moved into engagement with the actuating member 26 so as to positively lock the clutch member to said actuating member. The periphery of the brake actuating member 26 is provided with a cylindrical seat for a spring retarder ring 35 which is fixed thereon in any suitable manner as indicated at 36. The retarder 35 has elastic portions 37 which extend over and bear frictionally on the periphery of the clutch member 21 so as to apply a slight rotational drag thereon and thereby insure its traversal in response to the rotation of the crank shaft 17.

In operation, rotation of the crank shaft in the direction of the arrow $a$ in Fig. 1 causes the clutch member 21 to be traversed to the right into engagement with the interior of the barrel member so as to transmit rotation from the crank to the barrel when the travel of the nut is arrested by such engagement. The sprocket 13 is thereby caused to rotate and its motion is transmitted to the driving wheel or wheels of the vehicle in the usual manner by means of a sprocket chain, not illustrated. When rotation of the crank shaft is arrested the further rotation of the barrel member 12 by the inertia of the vehicle is transmitted to the clutch member 21, causing it to traverse to the left sufficiently to release it from the barrel member. The vehicle is then free to coast without causing rotation of the crank shaft.

Backward rotation of the crank shaft causes the clutch member 21 to be traversed to the left, since its rotation is resisted by the retarder 35, whereby the teeth 31 of the clutch member are brought into engagement with the teeth 32 of the actuating member 26. Further backward rotation of the crank shaft causes the clutch member 21 to move the actuating member 26 to the left whereby the conical engaging surfaces of the actuating members expand the brake sleeve into frictional engagement with the interior of the barrel member so as to resist the rotation thereof.

In the embodiment of the invention illustrated in Figs. 4 to 7, inclusive, a vehicle frame 41 is provided with a crank-hanger housing 42 of generally cylindrical shape, in one end of which is located an anti-friction bearing 43, and in the other end an anchor member 44 which is non-rotatably connected thereto by means of lugs 45 entering recess 46 in the housing. A fixed brake expanding cone member 47 is rigidly connected to the anchor member 44 as indicated at 48, and carries an anti-friction bearing 49. A driven barrel member 50 is journalled at one end on the bearing 49 and passes through the bearing 43 so as to be supported thereby and project outside the housing 42. A sprocket 51 is rigidly mounted on the projecting end of the barrel 50.

An anti-friction bearing 52 is mounted within the projecting end of the barrel 50 and another anti-friction bearing 53 is mounted on the expanding member 47 adjacent the anchor 44. A driving crank shaft 54 is journalled in the bearings 52 and 53 as by means of cones 55 and 55' adjustably fixed thereon, and has on its outer ends cranks 56 and 57 by which it may be rotated. The crank shaft is provided with a high pitch multi-lead thread for a portion of its length as indicated at 58, and a clutch member 59 is threaded thereon and formed with an external cone clutch surface 60 arranged to cooperate with a corresponding clutch surface 61 in the interior of the barrel 50. Rotation of the crank shaft in the direction of the arrow a causes the clutch member 59 to be moved to the right in Fig. 4 into driving engagement with the driven barrel 50.

A second brake expanding cone member 62 is loosely journalled on the crank shaft in spaced relation to the fixed expanding member 47, and braking means in the form of a pair of substantially semi-cylindrical shoes 63 and 64 are supported on the expanding members and arranged to be actuated thereby. Means for connecting the brake shoes and the movable expanding member to the fixed expanding member 47, so as to prevent rotation thereof, is provided in the form of a pair of rectangular keys 65 and 66 which are interposed between the brake shoes 63 and 64, and slidably engage at their ends in notches 67, 68, 69 and 70 formed in the adjacent ends of the expanding members 47, 62.

The expanding members are formed with conical surfaces 71 and 72, and the interior surfaces of the brake shoes 63 and 64 are similarly tapered so that when the expanding member 62 is moved to the left in Fig. 4, the shoes will be wedged apart and expanded into frictional engagement with the interior of the barrel 50. This action is brought about by backward rotation of the crank shaft 54 whereby the clutch member 59 is moved into engagement with the expanding member 62. The engaging surfaces of the clutch member and expanding member 62 are preferably provided with clutch teeth 73 and 74 respectively to prevent relative rotation when the parts are engaged.

Means for insuring traversal of the clutch member 59 upon rotation of the crank shaft 54 is provided in the form of a ring 75 loosely surrounding the crank shaft 54 between the clutch member 59 and the expanding member 62, said ring having axially extending arms 76 and 77 with outturned ends 78 and 79 which engage in notches 80, 81 in the interior of member 62 so as to be anchored thereto. A disc 82 is splined on the arms 76, 77 and is urged into abutting relation with the ring 75 by means of a compression spring 83 located between the disc 82 and the outturned ends 78, 79 of the arms 76, 77. A thrust ring 84 is preferably interposed between the spring and said outturned ends.

The retarding means is preferably assembled by bending the free ends of the arms 76, 77 inwardly and then threading on first the disc 82, then the spring 83 and finally the thrust ring 84 after which the arms are allowed to spring outwardly and hold the unit in assembled relation. When the unit is assembled on the crank shaft 54, the disc 82 is pressed into light frictional engagement with the interior of the clutch member 59, and since rotation of the unit is prevented by the anchorage of the arms 76, 77 in the expanding member 62, this engagement provides a slight drag on the clutch member 59 so as to insure its traversal when the crank shaft 54 is rotated.

A cylindrical bushing 85 is preferably arranged to bear within counterbores 86 and 87 conforming thereto in the adjacent ends of the expanding members 47, 62. This bushing assists in maintaining proper alignment of the expanding members without impeding the longitudinal movement of the expanding member 62.

The operation of this embodiment of the invention is substantially similar to that first described. In this case, however, when the brake shoes 63, 64 are wedged apart as a consequence to backward rotation of the crank shaft 54, the braking torque is transmitted from the brake shoes through the keys 65, 66 to the stationary expanding member 47, and through the anchor member 44 to the crank-hanger housing 42. The spring 83 of the retarder unit is preferably so designed as to its dimensions that the disc 82 will have only a very slight pressure in the clutch member 59 when it is in driving position, so that there will be only a negligible retarding effect at that time.

Although certain embodiments of the invention have been shown and described in detail, it will be understood that other embodiments are possible and that various changes may be made in the design and arrangement of the parts without departing from the spirit of the invention as defined in the claims appended hereto.

What is claimed is:

1. In a crank-hanger brake, a crank shaft, a pair of brake expanding members journalled thereon, a brake member supported and actuated by the expanding members, means preventing rotation of the brake and expanding members, a driven barrel journalled on the crank shaft at one end, and on one of the expanding members at the other end, and a clutch member threaded on the crank shaft and movable by forward rotation of the shaft into driving engagement with the barrel and by backward rotation of the shaft into operative engagement with the other expanding member, said brake comprising a pair of substantially semi-cylindrical shoes, the expanding members of which are provided with aligned notches, and keys mounted in said notches and between the brake shoes so as to spline the expanding members together and prevent rotation of the brake shoes.

2. In a crank-hanger brake, a crank shaft, a pair of brake expanding members journalled thereon, a brake member supported and actuated by the expanding members, means preventing rotation of the brake and expanding members, a driven barrel journalled on the crank shaft at one end, and on one of the expanding members at the other end, and a clutch member threaded on the crank shaft and movable by forward rotation of the shaft into driving engagement with the barrel and by backward rotation of the shaft into operative engagement with the other expanding member, including further a frictional connection between the clutch member and the adjacent brake expanding member comprising a ring having axially extending arms with outturned ends anchored in one of said members, a disc splined on said arms in position to bear frictionally on the other of said members and a compression spring between said disc and the outturned ends of said arms.

3. In a crank-hanger brake for velocipedes, a tubular crank-hanger housing having a plain cylindrical interior surface and a plurality of slots at one end, a bearing cup having a radial flange seated in the unslotted end of the housing with the flange abutting the end of the housing, a dished anchor plate closing the slotted end of the housing having lugs seated in said slots, a second bearing cup seated in the anchor plate, a sleeve having a thrust shoulder forming an abutment for the anchor plate and a non-circular portion adjacent thereto on which the anchor plate and said second bearing cup are fixedly mounted, a driving axle traversing said sleeve having a bearing cone adjustably mounted thereon, anti-friction bearings in said bearing cup cooperating with said cone to form a radial and thrust bearing for the axle, a driven barrel member extending into the open end of the housing with its inner end journalled on said sleeve, and its outer end having a radial and thrust bearing in the first mentioned bearing cup, a radial and thrust bearing for said axle in the outer end of said barrel, whereby adjustment of said bearing cone on the axle adjusts all the bearings while holding the anchor plate and first mentioned bearing cup in the housing; expansible cylindrical braking means loosely mounted in the barrel member and non-rotatably connected to the sleeve, and means responsive to forward rotation of the axle to clutch the axle to the barrel and responsive to backward rotation of the axle to de-clutch it from the barrel and expand the brake means into frictional engagement with the barrel.

E. ELLIOTT HOOD.

REFERENCES CITED

The following references are of record in the file of this patent:

UNITED STATES PATENTS

| Number | Name | Date |
|---|---|---|
| 1,471,538 | Baisi | Oct. 23, 1923 |
| 2,277,585 | Glacy | Mar. 24, 1942 |